(12) United States Patent
Savinell et al.

(10) Patent No.: US 9,559,375 B2
(45) Date of Patent: Jan. 31, 2017

(54) IRON FLOW BATTERIES

(75) Inventors: Robert F. Savinell, Solon, OH (US); Jesse S. Wainright, Willoughby Hills, OH (US)

(73) Assignee: CASE WESTERN RESERVE UNIVERSITY, Cleveland, OH (US)

(*) Notice: Subject to any disclaimer, the term of this patent is extended or adjusted under 35 U.S.C. 154(b) by 462 days.

(21) Appl. No.: 14/122,885

(22) PCT Filed: Jun. 1, 2012

(86) PCT No.: PCT/US2012/040429
§ 371 (c)(1),
(2), (4) Date: Apr. 3, 2014

(87) PCT Pub. No.: WO2012/167057
PCT Pub. Date: Dec. 6, 2012

(65) Prior Publication Data
US 2014/0227574 A1    Aug. 14, 2014

Related U.S. Application Data

(60) Provisional application No. 61/491,973, filed on Jun. 1, 2011.

(51) Int. Cl.
*H01M 8/18* (2006.01)
*H01M 10/38* (2006.01)
(Continued)

(52) U.S. Cl.
CPC ......... *H01M 8/188* (2013.01); *H01M 8/04186* (2013.01); *H01M 10/38* (2013.01); *H01M 8/20* (2013.01); *Y02E 60/528* (2013.01)

(58) Field of Classification Search
None
See application file for complete search history.

(56) References Cited

U.S. PATENT DOCUMENTS 4,069,371 A    1/1978    Zito
5,256,524 A    10/1993   Yoshimoto et al.
(Continued)

FOREIGN PATENT DOCUMENTS

CN    102035007    4/2011
CN    102089918    6/2011
(Continued)

OTHER PUBLICATIONS

Extended European Search Report for European application No. 12792876.0, dated Apr. 15, 2015.
(Continued)

*Primary Examiner* — Ula C Ruddock
*Assistant Examiner* — Matthew Van Oudenaren
(74) *Attorney, Agent, or Firm* — McDonald Hopkins LLC

(57) ABSTRACT

An iron based redox flow cell. The redox flow cell comprises a first half-cell comprising a first electrolyte providing a source of $Fe^{2+}$ ions and an electrode disposed within the first half-cell; a second half-cell comprising a second electrolyte providing a source of $Fe^{2+}$ and $Fe^{3+}$ ions and an electrode disposed within the second half-cell; and a separator between the first and second half-cells, where (a) the second electrolyte comprises a $Fe^{3+}$ stabilizing agent; (b) the first electrolyte comprises a hydrogen evolution suppressing agent; or (c) the first electrolyte comprises a hydrogen evolution suppressing agent, and the second electrolyte comprises a $Fe^{3+}$ stabilizing agent.

28 Claims, 7 Drawing Sheets

(51) Int. Cl.
  *H01M 8/04* (2016.01)
  *H01M 8/20* (2006.01)

(56) References Cited

U.S. PATENT DOCUMENTS

| | | | |
|---|---|---|---|
| 6,764,789 | B1 | 7/2004 | Sekiguchi et al. |
| 2001/0028977 | A1 | 10/2001 | Kazacos et al. |
| 2010/0003586 | A1 | 1/2010 | Sahu |
| 2010/0047671 | A1 | 2/2010 | Chiang et al. |
| 2011/0070483 | A1 | 3/2011 | Keshavarz et al. |
| 2012/0135278 | A1* | 5/2012 | Yoshie ................ H01M 8/188 429/7 |

FOREIGN PATENT DOCUMENTS

| | | |
|---|---|---|
| EP | 1501150 | 1/2005 |
| JP | 2000100460 | 4/2000 |
| JP | 2010092635 | 4/2010 |
| WO | 2010118060 | 10/2010 |
| WO | 2010143634 | 12/2010 |
| WO | WO2010143634 | * 12/2010 |
| WO | WO2012/167057 | 12/2012 |

OTHER PUBLICATIONS

Chinese Office Action for Chinese application No. 201280027075.8, dated Jul. 27, 2015.

Chen, et al.; Solution Redox Couples for Electrochemical Energy Storage; Journal of the Electrochemical Society; Jul. 1, 1981; pp. 1460-1467; vol. 128, No. 7.

Tsuru, et al.; Effects of boric acid on hydrogen evolution and internal stress in films deposited from a nickel sulfamate bath; Journal of Applied Electrochemistry; Jun. 1, 2002; pp. 629-634; vol. 32; Kluwer Academic Publishers; Netherlands.

Skyllas-Kazacos, et al.; Characteristics and performance of 1 kW UNSW vanadium redox battery*; Journal of Power Sources; Oct. 25, 1990; pp. 399-404; vol. 35; Elsevier Sequoia, Lausanne.

Hawthorne, et al.; Maximizing plating density and efficiency for a negative deposition reaction in a flow battery; Journal of Power Sources; May 29, 2014; pp. 216-224; vol. 269; Elsevier B.V. 2014.

International Search Report and the Written Opinion of the International Searching Authority, PCT/US12/040429, Dec. 17, 2012.

International Preliminary Report on Patentability, PCT/US12/040429, Dec. 12, 2013.

Wen, Y.H. et al., Studies on Iron (Fe3+/Fe2+)-Complex/Bromine (BR2/Br−) Redox Flow Cell in Sodium Acetate Solution, Journal of the Electrochemical Society, 153 (5) A929-A934 (2006).

Hruska, L.W. et al., Investigation of Factors Affecting Performance of the Iron-Redox Battery, J. Electrochem. Soc.: Electrochemical Science and Technology, Jan. 1981, pp. 18-25.

Linden, David, Handbook of Batteries and Fuel Cells, McGraw-Hill, NY, 1984, pp. 30-2-30-6.

Foller, P.C., Improved slurry zinc/air systems as batteries for urban vehicle propulsion, Journal of Applied Electrochemistry, 16 (1986) pp. 527-543.

Cotton, F. Albert, et al., Advanced Inorganic Chemistry, Wiley & Sons, NY, 1972, pp. 860-866.

Wen, Y.H, et al., A study of the Fe(III)/Fe(II)-triethanolamine complex redox couple for redox flow battery application, Electrochimica Acta 51 (2006) pp. 3769-3775.

Hruska et. al.; "Investigation of Factors Affecting Perfomance of the Iron-Redox Battery", J. Electrochem. Soc. 1981 vol. 128, Issue 1, 18-25 (1981), p. 19, Fig. 1; p. 22, col. 1, paragraph 3; p. 22, col. 2, paragraph 5.

Wen et. al.; "Studies on Iron .Fe3+/Fe2+)-Complex/Bromine (Br2/Br−) Redox Flow Cell in Sodium Acetate Solution." Journal of the Electrochemical Society. 153 (5) A929-A934 (2006), p. A931, col. 2.

International Search Report for PCT/US12/40429 dated Dec. 17, 2012.

* cited by examiner

IRON FLOW BATTERIES

CROSS REFERENCE TO RELATED APPLICATIONS

This application claims priority to PCT Application No. PCT/US2012/040429, entitled "IRON BASED FLOW BATTERIES", filed Jun. 1, 2012, which claims the benefit of U.S. Provisional Application No. 61/491,973, entitled "IRON BASED FLOW BATTERIES", filed Jun. 1, 2011, both of which are incorporated by reference herein in their entirety.

BACKGROUND

Reduction-oxidation (redox) flow batteries store electrical energy in a chemical form and subsequently dispense the stored energy in an electrical form via a spontaneous reverse redox reaction. A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. The electrolytes used in flow batteries are generally composed of ionized metal salts that are stored in large external tanks and are pumped through each side of the cell according to the charge/discharge current applied. Externally stored electrolytes can be flowed through the battery system by pumping, gravity feed, or by any other method of moving fluid through the system. The reaction in a flow battery is reversible, and the electrolyte can be recharged without replacing the electroactive material. The energy capacity of a redox flow battery, therefore, is related to the total electrolyte volume, e.g., the size of the storage tank. The discharge time of a redox flow battery at full power also depends on electrolyte volume and often varies from several minutes to many days.

The minimal unit that performs the electrochemical energy conversion is generally called a "cell," whether in the case of flow batteries, fuel cells, or secondary batteries. A device that integrates many such cells, coupled electrically in series or parallel, to get higher current or voltage or both, is generally called a "battery." As used herein, the term "battery" may refer to a single electrochemical cell or a plurality of electrically coupled cells. Like traditional batteries, cells may be "stacked" together in a flow battery system to achieve the desired power output. Thus, the terms "cell" and "battery" can be used interchangeably herein.

Since the electrolyte is stored externally, the amount of energy that can be stored by a flow battery is largely determined by the solubility of the chemicals and the size of the tanks. The size of the tanks and storage capacity can be easily scaled. A true flow battery has all chemical species flowing through the battery and stored in external tanks and thus the energy and volume capacities can be sized independently. The vanadium redox flow battery is an example of a true flow battery and has received the most attention in recent years. In a hybrid flow battery, at least one of the chemical states resides within the stack such as by plating out as a metal. One example of a hybrid flow battery is a zinc-bromine battery, where the zinc metal is platted out. In these systems, the power and energy capacities are coupled, and the plating density affects the energy/power capacity ratio.

Redox flow batteries can be utilized in many technologies that require the storage of electrical energy. For example, redox flow batteries can be utilized for storage of night-time electricity (which is inexpensive to produce) to subsequently provide electricity during peak demand when electricity is more expensive to produce or demand is beyond the capability of current production. Such batteries can also be utilized for storage of green energy, i.e., energy generated from renewable sources such as wind, solar, wave, or other non-conventional sources.

Many devices that operate on electricity are adversely affected by the sudden removal of their power supply. Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure at a generating station.

Other situations where uninterruptible power supplies can be of importance include, but are not limited to, buildings where uninterrupted power is critical, such as hospitals. Such batteries can also be utilized for providing an uninterruptible power supply in developing countries, many of which do not have reliable electrical power sources, resulting in intermittent power availability. Another possible use for redox flow batteries is in electric vehicles. Electric vehicles can be rapidly "recharged" by replacing the electrolyte. The electrolyte can be recharged separately from the vehicle and reused.

SUMMARY

The present invention provides an iron based flow battery. An iron flow battery in accordance with aspects the present invention can provide a power source exhibiting sufficiently high cell voltages and excellent coulombic and voltaic efficiencies. An iron flow battery also provides a battery and system that is significantly cheaper than conventional based redox flow batteries such as vandiaum based redox flow batteries or hybrid flow batteries such as zinc based flow batteries.

In one aspect, the present invention provides an iron based flow battery that is substantially free of reactive components other than iron.

In one aspect, the present invention provides an iron based flow battery comprising a first half-cell comprising a first electrolyte providing a source of $Fe^{2+}$ ions and an electrode disposed within the first half-cell, a second half-cell comprising a second electrolyte providing a source of $Fe^{2+}$ and $Fe^{3+}$ ions and an electrode disposed within the second half-cell, a separator between the first and second half-cells, a first storage tank external to the first half-cell for circulating the first electrolyte to and from the first half-cell, and a second storage tank external to the second half-cell for circulating the second electrolyte to and from the second half-cell, the half-cells conducting an oxidation reduction reaction to charge and discharge the battery, where the first electrolyte comprises a hydrogen evolution suppressing agent.

In another aspect, the present invention provides an iron based flow battery comprising a first half-cell comprising a first electrolyte providing a source of $Fe^{2+}$ ions and an electrode disposed within the first half-cell, a second half-cell comprising a second electrolyte providing a source of $Fe^{2+}$ and $Fe^{3+}$ ions and an electrode disposed within the second half-cell, a separator between the first and second half-cells, a first storage tank external to the first half-cell for circulating the first electrolyte to and from the first half-cell, and a second storage tank external to the second half-cell for circulating the second electrolyte to and from the second half-cell, the half-cells conducting an oxidation reduction reaction to charge and discharge the battery, where the second electrolyte comprises a $Fe^{3+}$ stabilizing agent.

In still another aspect, the present invention provides an iron based flow battery comprising a first half-cell comprising a first electrolyte providing a source of $Fe^{2+}$ ions and an electrode disposed within the first half-cell, a second half-cell comprising a second electrolyte providing a source of $Fe^{2+}$ and $Fe^{3+}$ ions and an electrode disposed within the second half-cell, a separator between the first and second half-cells, a first storage tank external to the first half-cell for circulating the first electrolyte to and from the first half-cell, and a second storage tank external to the second half-cell for circulating the second electrolyte to and from the second half-cell, the half-cells conducting an oxidation reduction reaction to charge and discharge the battery, where the first electrolyte comprises a slurry of conducting particles that iron can be plated onto.

In one aspect, the present invention provides, an iron flow redox cell comprising a first half-cell comprising a first electrolyte providing a source of $Fe^{2+}$ ions and an electrode disposed within the first half-cell; a second half-cell comprising a second electrolyte providing a source of $Fe^{2+}$ and $Fe^{3+}$ ions and an electrode disposed within the second half-cell; a separator between the first and second half-cells; a first storage tank external to the first half-cell for circulating the first electrolyte to and from the first half-cell; and a second storage tank external to the second half-cell for circulating the second electrolyte to and from the second half-cell, the half-cells conducting an oxidation reduction reaction to charge and discharge the battery, wherein (a) the second electrolyte comprises a $Fe^{3+}$ stabilizing agent; (b) the first electrolyte comprises a hydrogen evolution suppressing agent; or (c) the first electrolyte comprises a hydrogen evolution suppressing agent, and the second electrolyte comprises a $Fe^{3+}$ stabilizing agent.

In one embodiment, the iron flow redox cell comprises a $Fe^{3+}$ stabilizing agent chosen from cyanide, sucrose, glycerol, ethylene glycol, DMSO, acetate, oxalate, citrate, acetyl acetonate, fluoride, an amino acid, tartrate, malic acid, malonic acid, succinic acid, or a combination of two or more thereof.

In one embodiment, the $Fe^{3+}$ stabilizing agent comprises an amino acid chosen from glutamate, glycine, or a combination thereof.

In one embodiment, the concentration of $Fe^{3+}$ stabilizing agent is from about 0.01 M to about 10 M; from about 0.1 M to about 5 M; even from about 1 M to about 5 M.

In one embodiment, the redox cell comprises a hydrogen evolution suppressing agent chosen from boric acid, a heavy metal, or a combination thereof.

In one embodiment, the hydrogen evolution suppressing agent is chosen from Pb, Bi, Mn, W, Cd, As, Sb, Sn, or a combination of two or more thereof.

In one embodiment, the redox cell comprises boric acid in a concentration of from about 0.1 M to about 5 M.

In one embodiment, the redox cell comprises a heavy metal in a concentration of from about 0.0001 M to about 0.1 M.

In one embodiment, the pH of the anolyte is from about 1 to about 6. In another embodiment, the pH of the anolyte is from about 1 to about 1.8.

In one embodiment, the catholyte comprises a $Fe^{3+}$ stabilizing agent, and the pH of the anolyte is greater than 2.

In one embodiment, the electrode in the first half-cell comprises a slurry comprising electrically conductive particles, iron particles, iron coated particles, or a combination of two or more thereof.

In one embodiment, the electrically conductive particles are chosen from graphite particles.

In one embodiment, the electrode in the first half-cell comprises iron coated particles chosen from graphite, copper, titanium, or a combination of two or more thereof. In one embodiment, the electrically conductive particles have a particle size of from about 1 micron to about 1500 mircons.

In one embodiment, the redox cell has an energy to power ratio of from about 1:1 to about 10:1; from about 1:1 to about 5:1; even from about 1:1 to about 3:1.

In one embodiment, the redox cell has a plating capacity of from about 150 $mAh/cm^2$ to about 400 $mAh/cm^2$; even from about 150 $mAh/cm^2$ to about 200 $mAh/cm^2$.

In one embodiment, the redox cell has a plating efficiency of from about 60% to about 99%.

In one embodiment, the redox cell has a watt-hour efficiency of about 40% to about 85%.

In one embodiment, the temperature of the electrolyte is from about 20° C. to about 80° C. during operation of the cell.

In one embodiment, the redox cell comprises a first storage tank external to the first half-cell for circulating the first electrolyte to and from the first half-cell; and a second storage tank external to the second half-cell for circulating the second electrolyte to and from the second half-cell.

In another aspect, the present invention provides a battery comprising one or more of the redox flow cells having one or more features described in the preceding paragraphs.

An iron flow battery in accordance with the present invention can generally have a cell potential of about 1.2 V, which is comparable to vanadium based flow batteries and is generally non-toxic compared to other flow batteries. The iron flow battery, however, is significantly cheaper than vanadium flow batteries. The cost of a flow battery in accordance with aspects of the present invention may be about $250/kW for the battery and $30/kWh for the electrolyte and tanks, and provide a round-trip storage efficiency of about 75% or greater.

DETAILED DESCRIPTION

Figure 1:
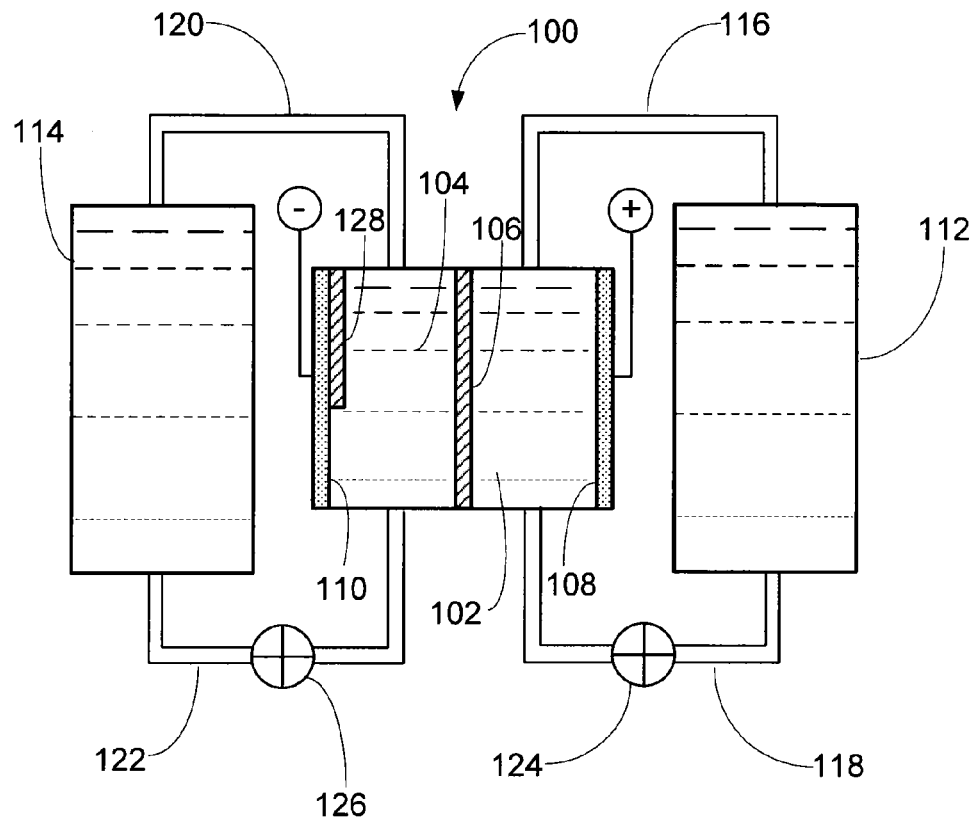
FIG. 1 is a schematic representation of a flow battery consistent with embodiments of the present invention.

FIG. 1 illustrates an embodiment of an iron flow cell system 100 suitable for use in connection with aspects of the present invention. Flow cell 100 includes two half-cells 102 and 104 separated by a separator 106. Half cells 102 and 104 include electrodes 108 and 110, respectively, in contact with an electrolyte such that an anodic reaction occurs at the surface of one of the electrodes and a cathodic reaction occurs at the other electrode. Electrolyte flows through each of the half-cells 102 and 104 as the oxidation and reduction reactions take place. In FIG. 1, the cathodic reaction takes place in half-cell 102 at electrode 108 (which is referred to herein as the positive electrode or the cathode), and the anodic reaction takes place in half-cell 104 at electrode 110 (which is referred to herein as the negative electrode or the anode).

The electrolyte in half-cells 102 and 104 flows through the system to storage tanks 112 and 114, respectively, and fresh/regenerated electrolyte flows from the tanks back into the half-cells. In FIG. 1, the electrolyte in half-cell 102 flows through pipe 116 to holding tank 112, and the electrolyte in tank 112 flows to the half-cell 102 through pipe 118. Similarly, the electrolyte in half-cell 104 can flow through pipe 120 to holding tank 114, and electrolyte from tank 114 flows through pipe 122 to half-cell 104. The systems can be configured as desired to aid or control the flow of electrolyte through the system and may include, for example, any suitable pumps or valve systems. In the embodiment depicted in FIG. 1, the system includes pumps 124 and 126 to pump the electrolyte from tanks 112 and 114, respectively to the half-cells. In some embodiments, the holding tank can segregate electrolyte that has flowed through the respective cells from electrolyte that has not. However, mixing discharged or partially discharged electrolyte can also be performed.

Electrodes 108 and 110 can be coupled to either supply electrical energy or receive electrical energy from a load or source. Other monitoring and control electronics, included in the load, can control the flow of electrolyte through half-cells 102 and 104. A plurality of cells 100 can be electrically coupled ("stacked") in series to achieve higher voltage or in parallel in order to achieve higher current.

In the iron flow battery, the half-cell reactions are as follows:
Charge:

$Fe^{2+}+2e^-\rightarrow Fe^0$  Negative Electrode $2Fe^{2+}\rightarrow 2Fe^{3+}+2e$  Positive Electrode Discharge:

$Fe^0\rightarrow Fe^{2+}+2e$  Negative Electrode $2Fe^{3+}+2e^-\rightarrow 2Fe^{2+}$  Positive Electrode Iron plates out (e.g., iron plating 128 in FIG. 1) onto the negative electrode 110 in half-cell 104 during charging and $Fe^{2+}$ is released upon discharge.

The electrolytes for the half-cells 102 and 104 are chosen to provide a suitable source of the ions required to carry out the reactions in each half-cell. The electrolyte used for the redox reactions at the positive electrode is a suitable salt solution comprising a source of ferrous ($Fe^{2+}$) and ferric ($Fe^{3+}$) ions. This electrolyte is also referred to herein as the catholyte. The electrolyte used for the reactions at the negative electrode comprises a source of $Fe^{2+}$ ions. This electrolyte is also referred to herein as the anolyte. The electrolyte may be any suitable salt including, but not limited to, the chloride, sulfate, nitrate salts or a combination of two or more thereof. In one embodiment, the catholyte comprises a solution of $FeCl_2$ and $FeCl_3$, which provides a relatively large charge carrying capacity as compared to other iron salts. The concentration of the salt providing the $Fe^{2+}$ ions (e.g., $FeCl_2$) may be from about 0.01 M to about 5 M, about 0.05 M to about 2.5 M, even about 0.1 M to about 1 M, and the concentration of the salt providing the $Fe^{3+}$ ions (e.g., $FeCl_3$) may be from about 0.01 to about 5 M, about 0.05 M to about 2.5 M, even about 0.1 M to about 1 M. In one embodiment, the concentration of the $FeCl_2$ is about 1.0 M, and the concentration of the $FeCl_3$ is about 1.0 M.

In one embodiment, the anolyte comprises an $FeCl_2$ solution. The $FeCl_2$ concentration may be from about 0.01 M to about 5 M.

In one embodiment, an iron flow battery includes an anolyte that comprises an additive for reducing hydrogen evolution at the negative electrode. Hydrogen evolution at the negative electrode (e.g., electrode 110) reduces the coulombic efficiency of the battery, which also reduces the watt-hr efficiency. Additionally, hydrogen evolution also causes the pH of the electrolyte to rise, which results in a ferric ion in the electrolyte precipitating out as ferric hydroxide. Suitable hydrogen evolution suppressing additives include, but are not limited to boric acid, heavy metals, and organic materials such as are suitable as surfactants and corrosion inhibitors. Coulombic efficiency can be evaluated by plating iron onto graphite substrates and subsequently stripping the iron off the graphite until the current falls below 10 µA. The coulombic efficiency is equal to the coulombs passed during stripping divided by the coulombs passed during plating.

In one embodiment, the electrolyte in the negative half-cell comprises boric acid. The concentration of the boric acid may be from about 0.1 M to about 5; from about 0.5 M to about 2 M; from about 0.7 M to about 1.5 M. In one embodiment, the concentration of the boric acid is about 1 M. At room temperature, 1 M boric acid is near the limit of solubility. Higher concentrations of boric acid may be employed at higher temperatures. It will be appreciated that the anolyte may have to be replenished with boric acid from time to time to keep the concentration at a suitable or useful level.

In one embodiment, the negative electrolyte comprises a metal additive suitable for suppressing hydrogen formation at the negative electrode. Examples of suitable heavy metals that may suppress hydrogen evolution at the negative electrode include, but are not limited to, Pb, Bi, Mn, W, Cd, As, Sb, Sn, combinations of two or more thereof, and the like. While not being bound to any particular theory, the metal additives may facilitate the formation of dendrite-free deposits and may be co-deposited on the anode along with iron. On discharge, the metals are stripped with the iron and returned to the electrolyte solution. The heavy metal additive may be present in an amount of from about 0.0001 to about 0.1 M. In another embodiment, the heavy metal additive may present in an amount of from about 0.001 to about 0.05 M. In still another embodiment, the heavy metal additive may be present in an amount of from about 0.01 to about 0.025 M.

The pH of the anolyte with the hydrogen evolution suppressing agent may be from about 1 to about 6. The operating pH of the solution may be selected as desired for a particular purpose or intended use. In one embodiment, the pH of the anolyte is from about 2 to about 4. In another embodiment, the pH of the anolyte is from about 1 to about 1.8.

Figure 2:
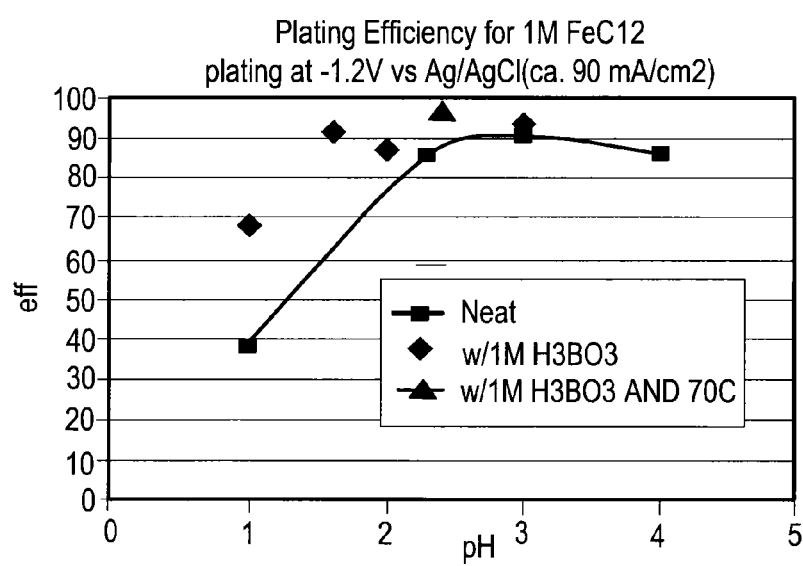
FIG. 2 is a graph illustrating the plating efficiency of iron from a ferric chloride solution with and without boric acid.

As shown in FIG. 2, the plating efficiency of iron from the $FeCl_2$ solution increases at higher pH levels. At pH levels above 2, however, $Fe^{3+}$ is insoluble and will begin to precipitate out of solution as ferric hydroxide ($Fe(OH)_3$). If a particular application employs an anolyte having a pH greater than 2, then the system is desirably configured to avoid the precipitation of $Fe^{3+}$. This can be accomplished by employing an ion selective separator, e.g., an anionic membrane, as the separator 106 in the cell. The system can be further configured using a separator to maintain a pH gradient to provide an anolyte with a pH above 2 and a catholyte with a pH below 2. Alternatively, and as further described below in accordance with another aspect of the invention, the electrolyte may also comprise a ligand to bind and keep the $Fe^{3+}$ ions in solution. Operating the iron flow battery such that the pH of the negative electrolyte is above 2 will not require the use of an ion selective membrane. The use of an ion selective membrane may be employed to prevent crossover of ferric ion that could attach the iron deposit and lower the coulombic efficiency.

In another embodiment, an iron flow battery and system comprises a catholyte comprising an additive to control the ferrours/ferric couple. As described above, where the pH of the electrolyte is above 2, ferric ions in the electrolyte will begin to precipitate out. The $Fe^{3+}$ stabilizing ligand may be chosen as desired for a particular purpose or intended use. In one embodiment, the catholyte comprises a ligand suitable for stabilizing the ferric ion to significantly avoid or prevent the ferric ion from precipitating out (as ferric hydroxide) while maintaining a relatively high open circuit potential ($E^0$). This additive may be referred to herein as an $Fe^{3+}$ stabilizing ligand. Additionally, it is desirable to employ a ligand that does not significantly deter the electrochemical kinetics of the $Fe^{2+/3+}$ reaction. The iron flow battery may use a modified anolyte or catholyte described herein alone or in combination with one another. In one embodiment, the iron flow battery comprises a modified anolyte comprise a hydrogen evolution suppressing agent. In another embodiment, the iron flow battery comprises a modified catholyte comprising a $Fe^{3+}$ binding ligand. In still another embodiment, the iron flow battery employs an anolyte comprising a hydrogen evolution suppressing agent and a catholyte comprising $Fe^{3+}$ binding agent.

In one embodiment, the $Fe^{3+}$ stabilizing ligand is chosen from a material exhibiting an equilibrium constant that is larger than that of $OH^-$ and similar to those of $Fe^{2+}$ and $Fe^{3+}$ to provide a sufficiently high potential ($E^0$) and exchange current density ($i_0$). In one embodiment, the $Fe^{3+}$ stabilizing ligand may be chosen from cyanide, sucrose, glycerol, ethylene glycol, DMSO, acetate, oxalate, citrate, acetyl acetonate, fluoride, tartrate, malic acid, succinic acid, amino acids (including, but not limited to, glutamate, glycine, etc.), combinations of two or more thereof, etc. In one embodiment, glycerol is employed as the $Fe^{3+}$ stabilizing ligand.

The concentration of the $Fe^{3+}$ stabilizing ligand can be present in the electrolyte at a concentration sufficient to prevent the $Fe^{3+}$ ions from precipitating out. In one embodiment, the concentration of the $Fe^{3+}$ stabilizing ligands is from about 0.01 M to about 10 M. In another embodiment, the concentration of the $Fe^{3+}$ stabilizing ligands is from about 0.1 M to about 5 M. In still another embodiment, the concentration of the $Fe^{3+}$ stabilizing ligands is from about 1 M to about 5 M. It will be appreciated that the $Fe^{3+}$ stabilizing ligand can be considered a co-solvent in the catholyte.

In embodiments, the $Fe^{3+}$ stabilizing ligand may have the effect of decreasing the conductivity of the catholyte. Where the conductivity of the $Fe^{3+}$ stabilizing ligand is low, it may be desirable to add a suitable salt to improve the electrical conductivity of the electrolyte solution if needed. Suitable salts may include, but are not limited to, NaCl, KCl, $NH_4Cl$, LiCl, and the like.

As described above, an iron flow battery can employ a catholye with a $Fe^{3+}$ stabilizing ligand in conjunction with an anolyte comprising a hydrogen evolution suppressing agent. It will be appreciated, however, that the use of such an anolyte additive may not be necessary when the catholyte comprises a $Fe^{3+}$ stabilizing ligand because the electrochemical kinetics for both the $Fe^{2+/3+}$ reaction at the cathode and the $Fe^{2+}/Fe^0$ reaction at the anode may be rapid enough to effectively suppress hydrogen evolution at the anode without an additive added specifically for that purpose.

The electrodes (e.g., electrodes 108 and 110) employed in the iron flow battery can be selected from any suitable electrode material. In one embodiment, the electrodes are graphite electrodes. The electrodes can be configured in a particular shape as desired for a particular purpose or intended use. In one embodiment the electrodes can be provided with a substantially planar surface. In one embodiment, the negative electrode can be provided with a contoured or shaped surface to provide a larger surface area. Additionally, the electrodes can be a porous foam.

The separator (e.g., separator 106) can be chosen as desired for a particular purpose or intended use. In one embodiment, the membrane is a porous membrane without any active ion-exchange material. In another embodiment, the membrane is an ion-selective porous membrane. In one embodiment, the membrane can be an anionic membrane. As previously described, an anionic membrane may be suitable where the system employs an anolyte and catholyte having different pH levels and it is necessary to keep the electrolytes from cross mixing.

In one embodiment, the iron flow battery and system is provided to decouple the power and energy at the negative electrode. In the system shown in FIG. 1, the energy stored and the power delivered can be limited by the thickness of the iron plating that is achieved. In an embodiment for decoupling the power, iron plating is carried out on a substrate that can be circulated through the cell.

In one embodiment a system for decoupling the power/energy at the anode comprises employing a slurry electrode or fluidized bed electrode as the negative electrode. The slurry comprises particles sufficient to impart electrode conductivity to the electrolyte. Suitable particles include carbon-based, e.g., graphitic, particles, iron particles, iron coated particles, or a combination of two or more thereof. The iron coated particles can include an electrically conductive particle as the core. In one embodiment, the iron coated particles comprise carbon-based particles, copper particles, or titanium particles coated with iron. The iron coated particles can be particles comprising iron plating. Over time, the iron particles and iron coating can be depleted, and the use of iron coated particles provides a slurry that still exhibits electrical conductivity via the electrically conductive particles. In one embodiment, a slurry electrode comprises iron particles suspended in a sufficient volume of electrolyte to enable the slurry to be pumped through the battery, while still maintaining particle to particle contact for electrical conductivity. The particle size can be chosen as desired. In one embodiment, the partials can have a particle size of from about 1 micron to about 1500 microns; from about 5 microns to about 1000 microns; from about 10 microns to about 500 microns; from about 20 microns to about 250 microns; even from about 50 microns to about 100 microns. In one embodiment, the particles have an average particle size of about 100 microns. Here as elsewhere in the specification and claims numerical values can be combined to form new or non-disclosed ranges. Without being bound to any particular theory, using larger particles may reduce particle to particle contacts and increase the conductivity of the slurry. Using a slurry electrode provides a high surface area to minimize the over potential for iron plating/dissolution and a higher cycle life (compared to plating on a flat electrode).

For storage purposes, it may be desirable to de-water the slurry outside of the electrochemical cell. This would minimize the total volume of material to be stored and the total volume of electrolyte needed, and lower the corrosion of iron while in storage. The electrolyte removed in de-watering can then be used to re-slurry the conductive particles entering the battery.

In another embodiment, the negative electrode can be provided by coils of steel onto which the iron will be plated. A coil of steel (where the steel is about 1.2 m wide and up to 1,000 m long) that is plated to a thickness of 10 um may provide over 90,000 Ahr of storage. Other variations of the coil approach can be employed. For example, instead of a steel coil, the plating can be done on a metalized polymer film. The polymer film can be coated with any suitable metal such as with a thin layer of copper or other inert metal such as gold. This could reduce the weight, complexity and cost of a large system.

A decoupled power/energy system may be particularly suitable for larger iron flow battery systems. Smaller systems or certain applications may not require a decoupled power and energy system. In these cases, negative electrode substrates such as graphite felt might be reasonable if designed appropriately for uniform current distribution or reaction distributions from current collector that decrease towards the membrane.

An iron flow battery can be operated at a current density of about 75 to about 400 mA/cm$^2$. In one embodiment, the battery is operated at a current density of about 80 to about mA/cm$^2$. In another embodiment, the battery is operated at a current density of about 100 mA/cm$^2$. The temperature of the electrolyte can be from about 25° C. to about 80° C. In one embodiment, the temperature of the bath is about 70° C. It will be appreciated that, even if operating at about room temperature (e.g., about 25° C.), the temperature of the bath may increase during operation.

An iron flow battery in accordance with aspects of the present invention can have an energy to power ratio of from about 1:1 to over 10:1 with a de-coupled system. In one embodiment, the energy to power ratio is from about 1:1 to about 5:1. In another embodiment, the energy to power ratio is from about 1:1 to about 3:1. The plating capacity of the system with a planar substrate can be from about 150 mAh/cm$^2$ to about 400 mAh/cm$^2$. In one embodiment, the plating capacity of the system may be from about 150 mAh/cm$^2$ to about 200 mAh/cm$^2$. Larger plating capacities increase the discharge time and, consequently, the energy to power ratio of the system.

The watt-hour efficiency of the bath can be from about 40 to about 85%. In one embodiment, the watt-hour efficiency is from about 45 to about 55%. As used herein, watt-hour efficiency refers to the voltage on discharge divided by the voltage on charge at equal currents during charge and discharge of the cell. The voltage on charge refers to the open circuit potential minus the sum of the kinetic, ohmic, and mass transfer overpotentials on charging of the cell. The voltage on discharge refers to the open circuit potential minus the sum of the kinetic, ohmic, and mass transfer overpotentials on discharging of the cell.

An iron flow battery in accordance with aspects of the present invention can be charged and discharged repeatedly and is suitable as a battery for temporary storage of electric power in a variety of applications. An iron flow battery may be used in a wide variety of applications including, but not limited to, use as part of an energy transmission grid, power plants, and the like.

As used herein, individual numerical values can be combined to form additional and/or non-disclosed ranges.

Aspects of the invention are further understood with respect to the following examples. The examples illustrate possible embodiments of the invention and are not intended to limit the invention or scope of the appended claims.

EXAMPLES

Examples 1-2

Plating is conducted in a 1 M FeCl$_2$ bath at −1.2V (about 90 mA/cm2) against a Ag/AgCl reference electrode. Examples 1 and 2 comprise boric acid at a concentration of 1 M. Example 1 is conducted at room temperature and Example 2 is conducted at 70° C. FIG. 2 illustrates the plating efficiency as a function of pH for FeCl$_2$ solutions without any additive and solutions with 1 M boric acid. As shown in FIG. 2, plating efficiency increases with pH, and the solutions comprising boric acid have a greater efficiency than the solution without boric acid. Additionally, plating efficiency improves for the boric acid containing electrolytes at elevated temperatures.

Examples 3-6

Plating is conducted in a 1 M FeCl$_2$ bath containing glycerol at a concentration of 10 M. Table 1 shows the plating efficiency of glycerol at various electrolyte pH levels.

TABLE I

| | Solution Composition | | | |
|---|---|---|---|---|
| Example | FeCl$_2$ | Glycerol | Plating Efficiency | pH |
| 3 | 1M | 10M | 87.5% | 2.25 |
| 4 | 1M | 10M | 97.9% | 3.9 |
| 5 | 1M | 10M | 94.5% | 3.9 |
| 6 | 1M (2M NH$_4$Cl) | 10M | 81.6% | 2.34 |

As shown in Table 1, glycerol provides a high iron plating efficiency even at reduced pH levels.

Figure 3:
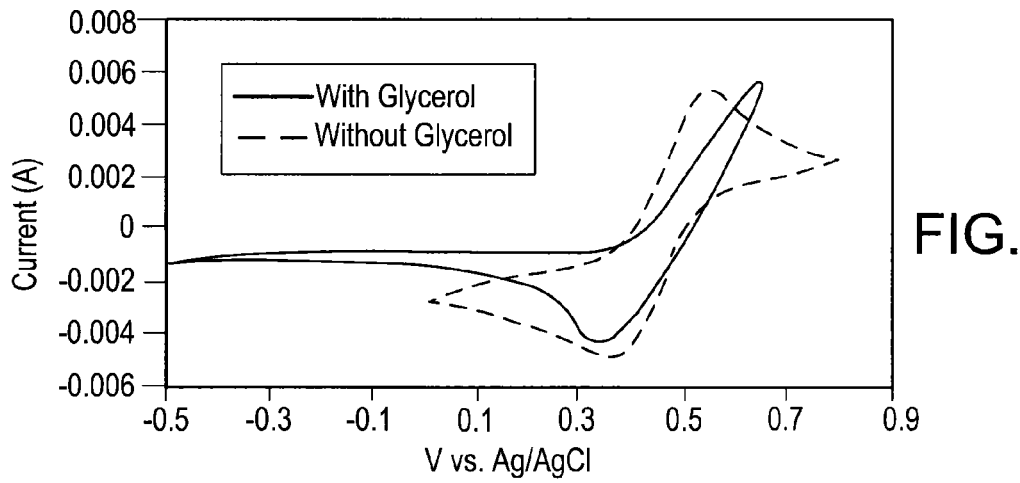
FIG. 3 is a cyclic voltammogram for the $Fe^{+2/+3}$ oxidation/reduction at a platinum electrode with and without glycerol.

FIG. 3 is a cyclic voltammogram showing the Fe$^{2+}$/$^{3+}$ redox potential at a platinum electrode in solutions with and without glycerol at room temperature (using a Ag/AgCl reference electrode). As shown in FIG. 3, the redox kinetics of the solution comprising glycerol are not significantly changed and the E$^0$ potential is not shifted compared to the non-glycerol system. Additionally, the use of glycerol in the catholyte may allow for plating with coulombic efficiencies of 90% or greater.

Examples 7-9

Figure 4:
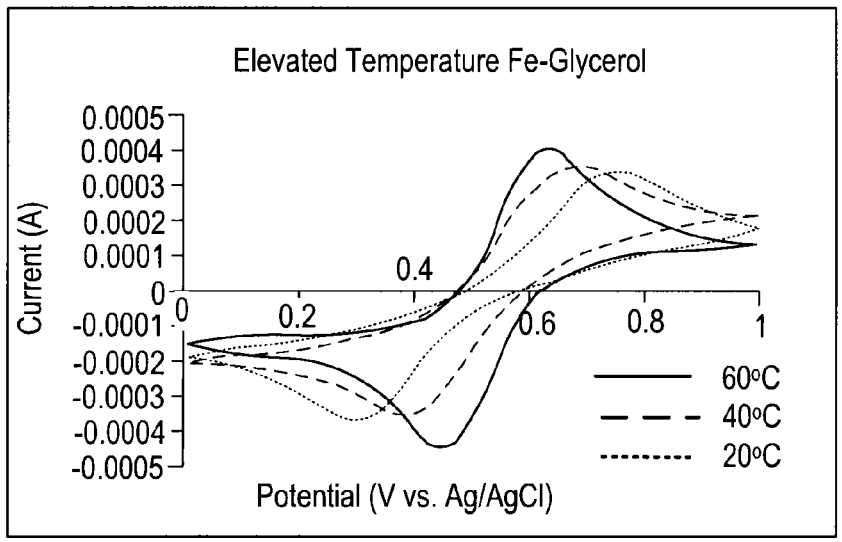
FIG. 4 is a cyclic voltammogram for the $Fe^{+2/+3}$ oxidation/reduction at a platinum electrode with glycerol at different electrolyte temperatures.
Figure 5:
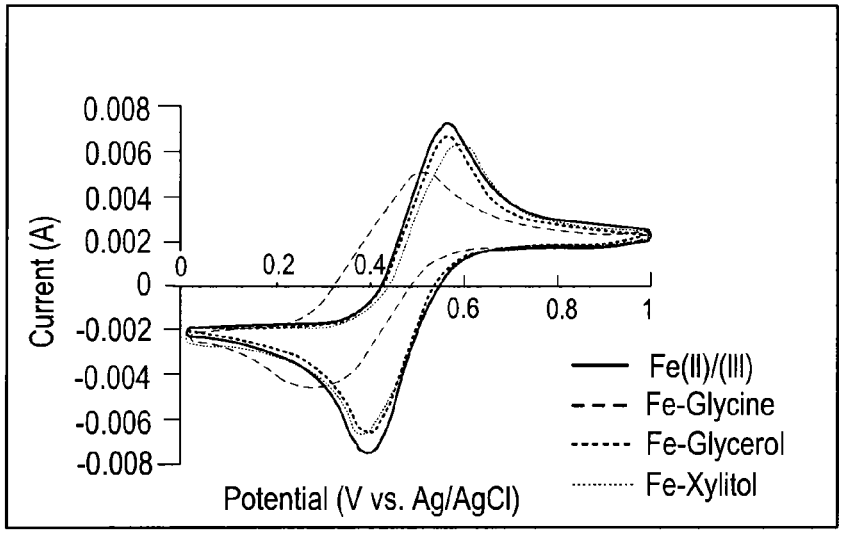
FIG. 5-15 are cyclic voltammograms for the $Fe^{+2/+3}$ oxidation/reduction at a platinum electrode for electrolytes containing various $Fe^{3+}$ stabilizing agents.
Figure 6:
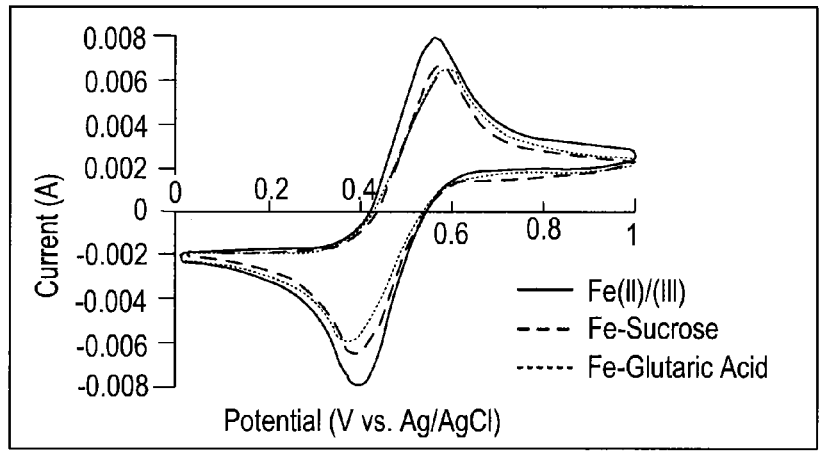
Figure 7:
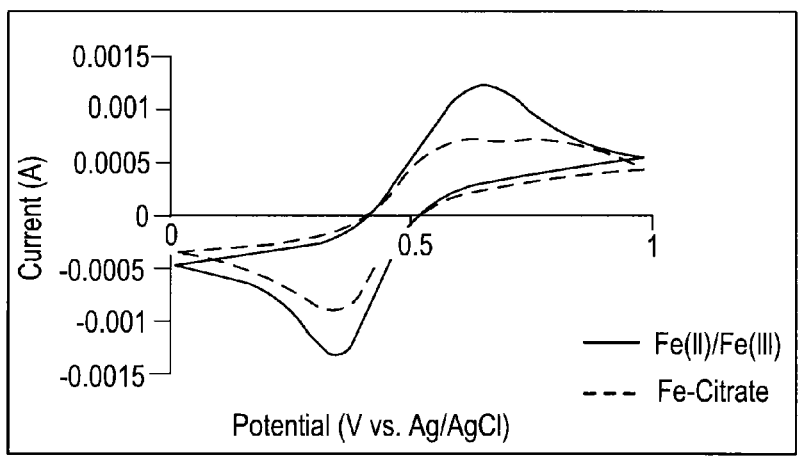
Figure 8:
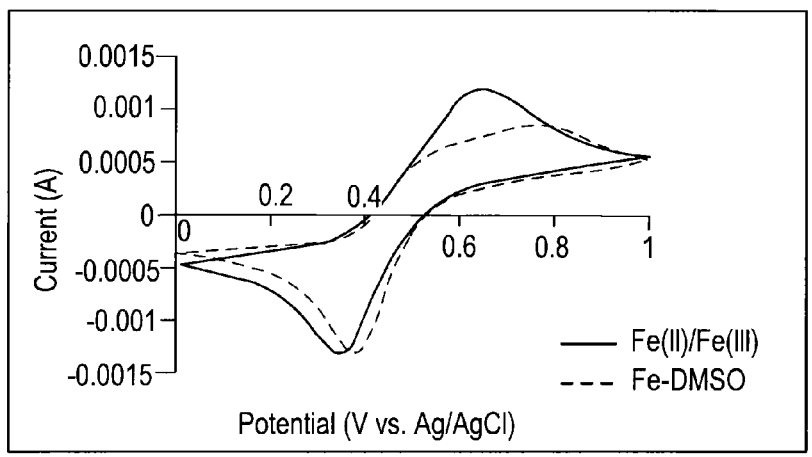
Figure 9:
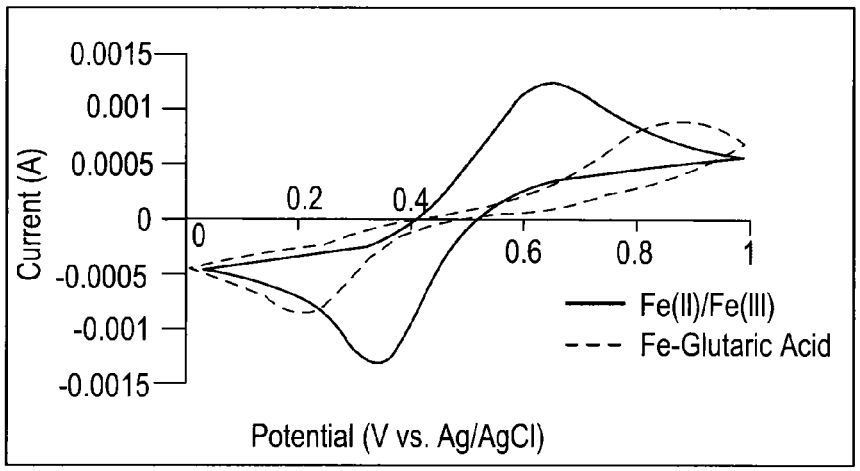
Figure 10:
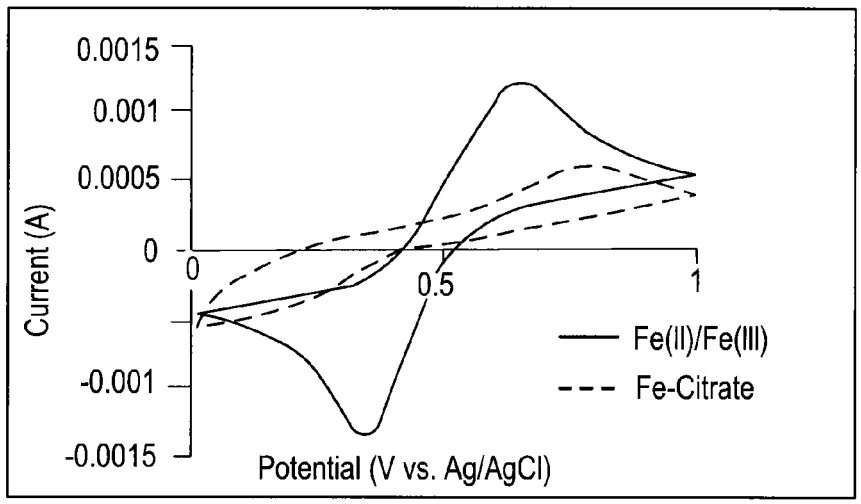
Figure 11:
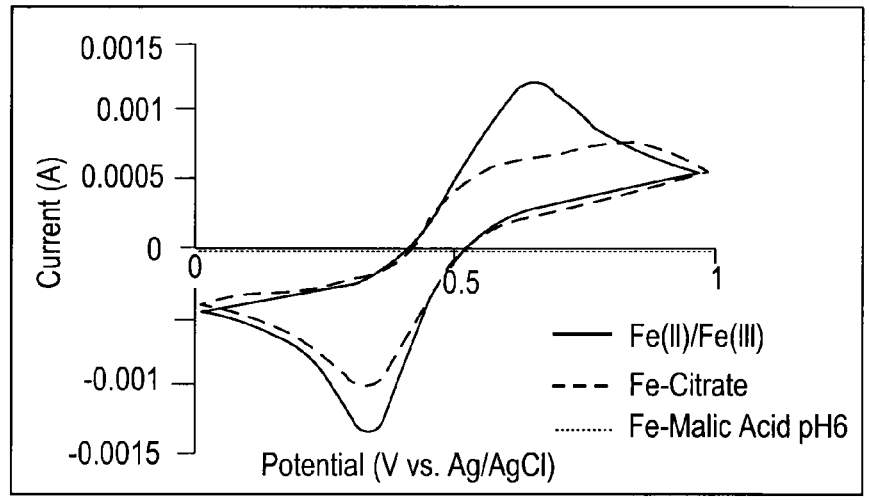
Figure 12:
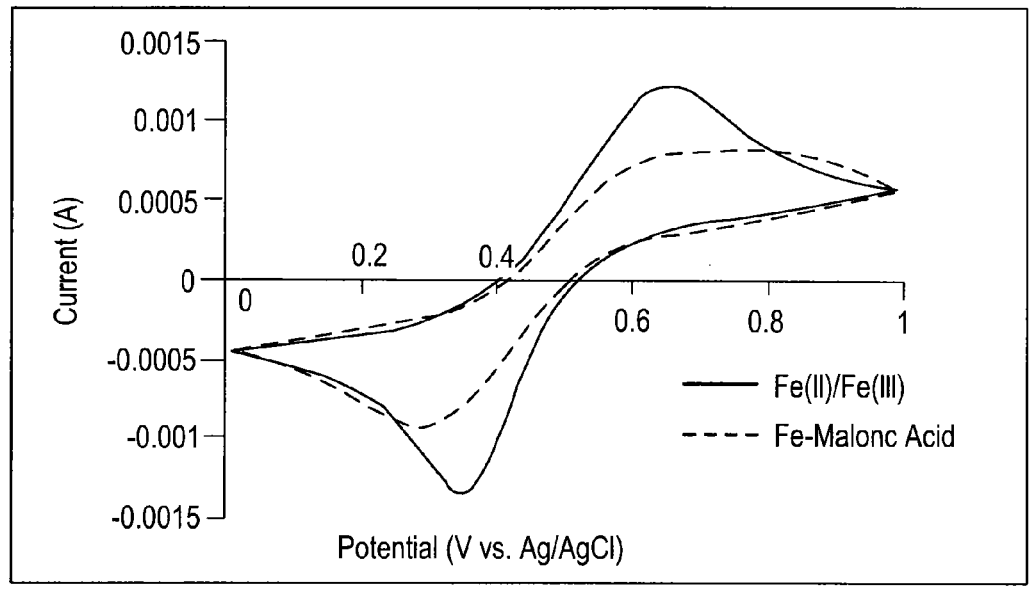
Figure 13:
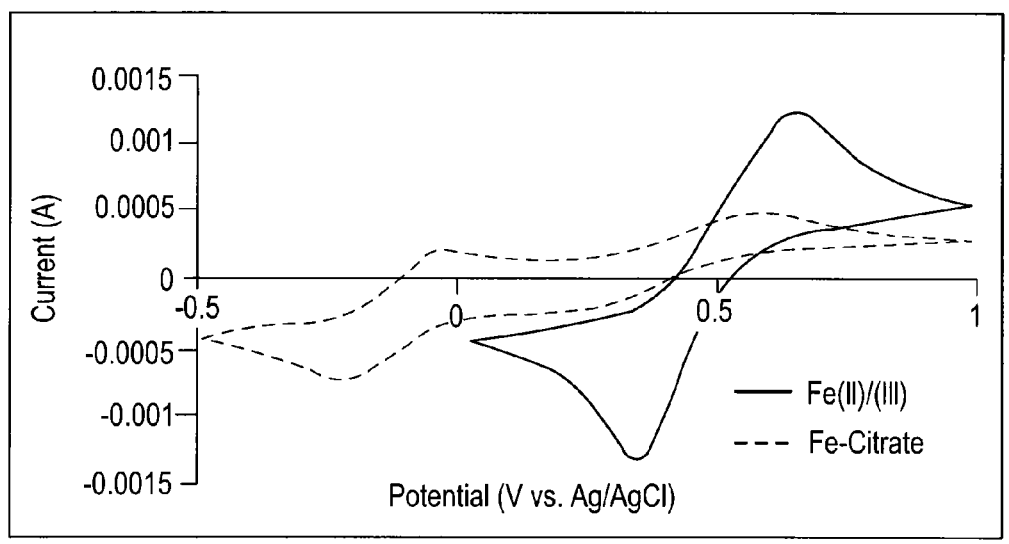
Figure 14:
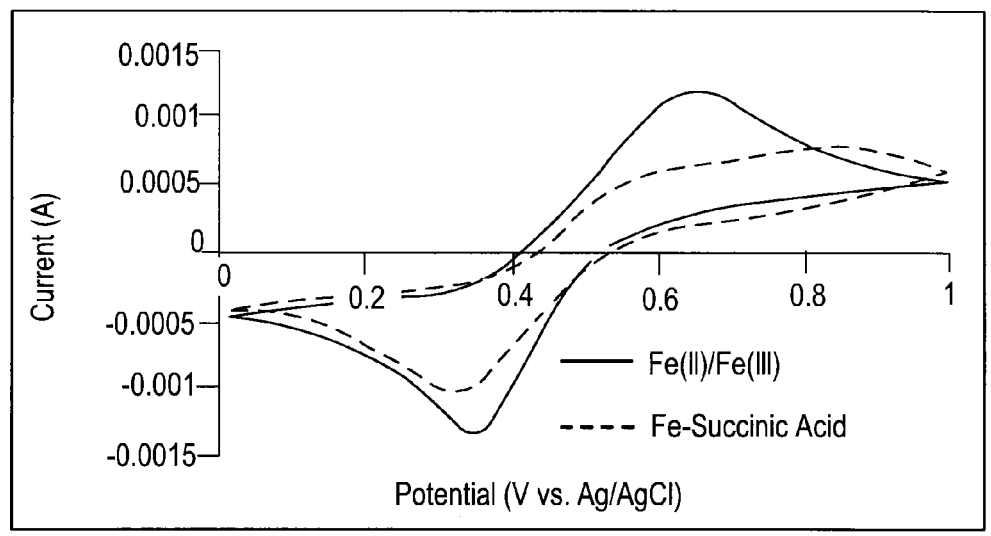
Figure 15:
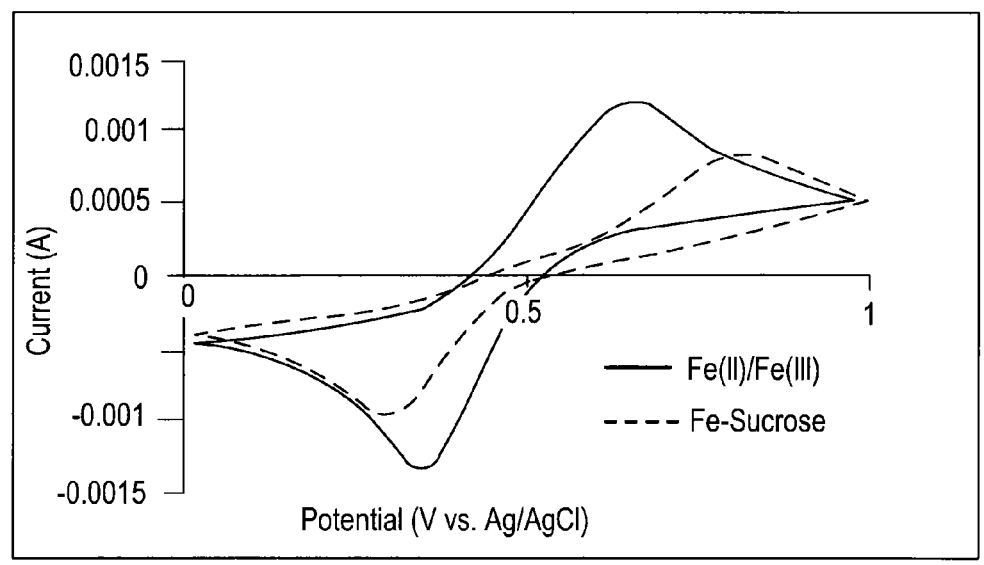

Cyclic voltammetry is performed in an electrolyte with a composition of 0.1 M FeCl2, 0.1 M FeCl3, 1 M NaCl, and 0.8 M glycerol using a glassy carbon working electrode, a platinum mesh counter electrode, and a Ag/AgCl reference electrode, at a sweep rate of 10 mV/s. The pH of the electrolyte is 2, and the temperature of the electrolyte is 60° C. (Example 7), 40° C. (Example 8), or 20° C. (Example 9). FIG. 4 shows the cyclic voltammograms for the different trials, which shows that the redox reaction kinetics and mass transport can be improved at higher temperatures.

Examples 10-25

Cyclic voltammetry is performed in an electrolyte with a composition of 0.1 M $FeCl_2$, 0.1 M $FeCl_3$, 1 M NaCl, and 0.3 M $Fe^{3+}$ stabilitzing agent using a glassy carbon working electrode, a platinum mesh counter electrode, and a Ag/AgCl reference electrode, at a sweep rate of 10 mV/s. The $Fe^{3+}$ stabilizing agents are glycine (Example 10); glycerol (Example 11); xylitol (Example 12); sucrose (Example 13); glutaric acid (Example 14); acetate (Example 15); aspartic acid (Example 16); citrate (Example 17); dimethyl sulfoxide (Example 18); glutaric acid (Example 19); lactate (Example 20); malic acid (Example 21); malonic acid (Example 22); oxalate (Example 23); succinic acid (Example 24); and sucrose (Example 25). FIGS. 5-15 show cyclic voltammograms for the electrolytes of Examples 10-14 as compared to an electrolyte (Comparative Ex. 2) that does not contain an $Fe^{3+}$ stabilizing ligand.

Examples 26-29

Figure 16:
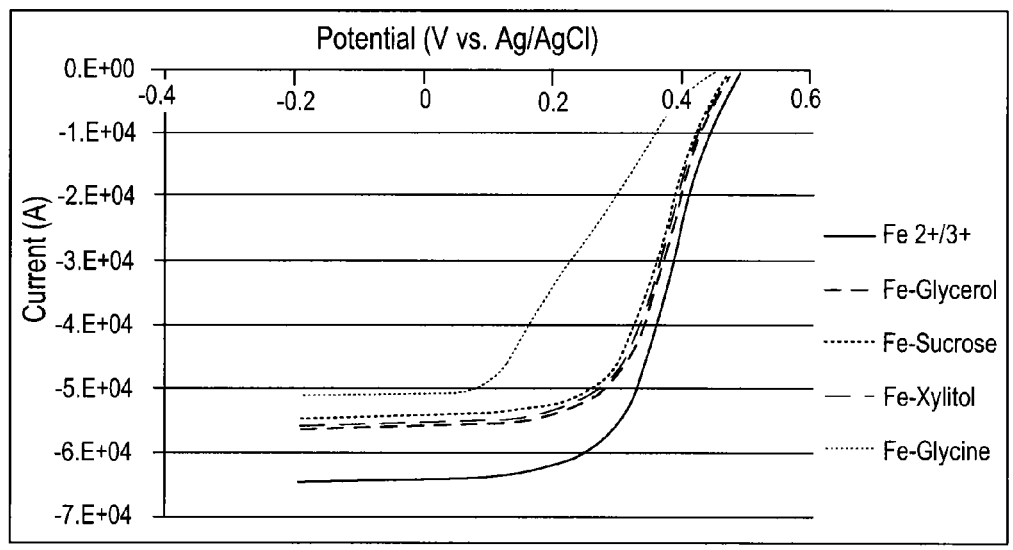
FIG. 16 shows the polarization curves for various electrolytes obtained under rotational disk electrode testing.

Rotating disk electrode experiments are performed using a glassy carbon rotating disk electrode in electrolytes with a composition of 0.01 M FeCl2, 0.01 M FeCl3, 0.03 M of a $Fe^{3+}$ stabilizing agent, and 1 M NaCl. FIG. 16 shows the polarization curves for the various electrolytes. Glycerol, xylitol, and sucrose show very similar effects on the reaction rate and limiting current. Glycine slows the reaction, and decreases the limiting current much more than the other ligands. The Fe-ligand complexes all have smaller diffusion coefficients than the electrolyte without any $Fe^{3+}$ stabilizing agent (Comparative Ex. 3). This may be due to a combination of the size of the complex and increased viscosity of the electrolyte with excess ligand present.

Example 30

Figure 17:
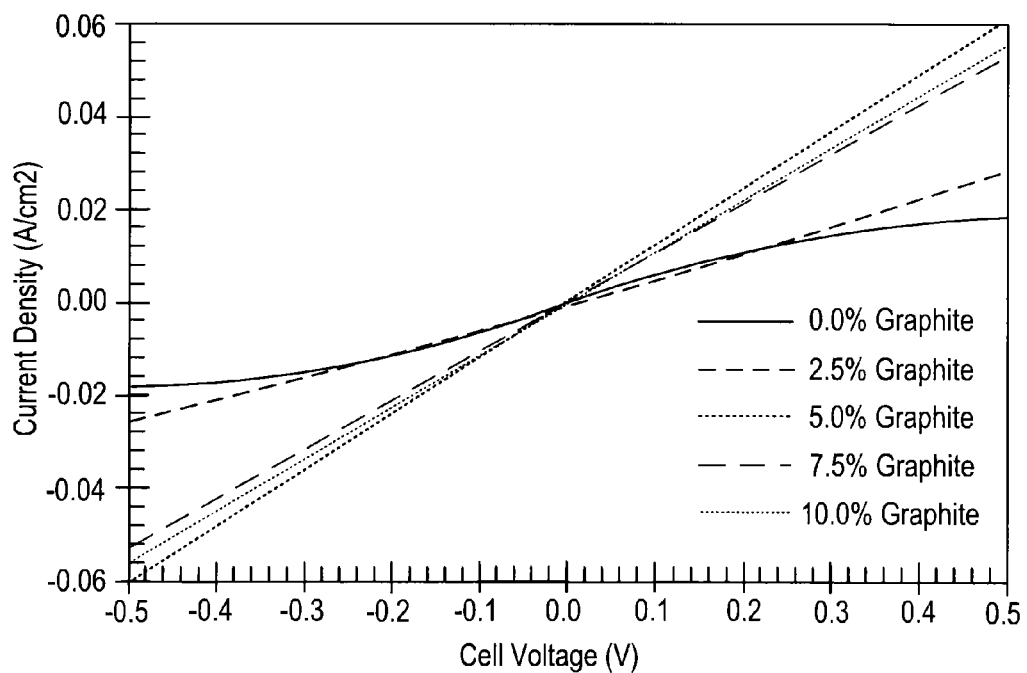
FIG. 17 is a graph illustrating the current density versus the cell voltage for cells employing slurry electrodes employing graphite particles.

A symmetrical cell with two half-cells is provided where. The cells are divided by a Nafran 117 membrane. the, the $Fe^{2+} \leftrightarrows Fe^{3+}$ reaction occurring on both sides, is provided with an electrolyte on both sides is 0.5 M $FeCl_2$, 0.5 M $FeCl_3$, and 1.0 M NaCl, and the pH is about 1. The electrolyte is stored in one reservoir that feeds both sides of the cell and is recirculated. The cell employs a slurry electrode system, and the electrolyte contains graphite particles having a diameter of about 7-11 micrometers. The symmetrical cell performance is investigated using cyclic voltammetry between –0.5 V and 0.5V at scan rates of 3 mV/sec and 30 mV/sec and with AC impedance and is intended to demonstrate the effectiveness of a slurry electrode. Electrolyte flow rates of 20, 30, 40, and 50 mL/min are also investigated. Different loadings of carbon particles are evaluated to see at what loading the electrolyte became electrically conductive, at which point the cell behavior changes from that of the flat plate current collectors, to that for a system with a higher surface area distributed electrode. A typical result for the variation with different carbon loadings is shown in FIG. 17 for carbon loadings from 0 to 10 vol % and an electrolyte flow rate of 40 mL/min. The current density in this figure is based on the geometric area of the current collector.

For a flat plate electrode the theoretical limiting current is estimated to be 41 mA/cm$^2$ and 56 mA/cm$^2$ for 20 mL/min and 50 mL/min flow rates, respectively using the typical correlations for laminar flow. In FIG. 17, the cyclic voltammograms for the 0 and 2.5% carbon loadings show curvature around +/–0.3V as the limiting current is approached, consistent with flat plate behavior at these loadings Although aspects of an iron flow battery have been shown and described with respect to certain embodiments, it is understood that equivalents and modifications may occur to others skilled in the art upon reading and understanding the specification. The present invention includes all such equivalents and modifications.

What is claimed is:

1. An iron flow redox cell comprising:
    a first half-cell comprising a first electrolyte providing a source of $Fe^{2+}$ ions and an electrode disposed within the first half-cell;
    a second half-cell comprising a second electrolyte providing a source of $Fe^{2+}$ and $Fe^{3+}$ ions and an electrode disposed within the second half-cell;
    a separator between the first and second half-cells;
    a first storage tank external to the first half-cell for circulating the first electrolyte to and from the first half-cell;
    a second storage tank external to the second half-cell for circulating the second electrolyte to and from the second half-cell;
    wherein the first and second half-cells conduct an oxidation reduction reaction to charge and discharge the iron flow redox cell, wherein (a) the second electrolyte comprises a $Fe^{3+}$ stabilizing agent; (b) the first electrolyte comprises a hydrogen evolution suppressing agent; or (c) the first electrolyte comprises a hydrogen evolution suppressing agent, and the second electrolyte comprises a $Fe^{3+}$ stabilizing agent; and
    wherein the electrode in the first half-cell comprises an aqueous slurry comprising electrically conductive particles, iron particles, iron coated particles, or a combination thereof.

2. The iron flow redox cell of claim 1, comprising a $Fe^{3+}$ stabilizing agent chosen from cyanide, sucrose, glycerol, ethylene glycol, DMSO, acetate, oxalate, citrate, acetyl acetonate, fluoride, an amino acid, tartrate, malic acid, malonic acid, succinic acid, or a combination of two or more thereof.

3. The iron flow redox cell of claim 2, wherein the $Fe^{3+}$ stabilizing agent comprises an amino acid chosen from glutamate, glycine, or a combination thereof.

4. The iron flow redox cell of claim 1, wherein the concentration of $Fe^{3+}$ stabilizing agent is from about 0.01 M to about 10 M.

5. The iron flow redox cell of claim 1 wherein the concentration of $Fe^{3+}$ stabilizing agent is from about 0.1 M to about 5 M.

6. The iron flow redox cell of claim 1, wherein the concentration of $Fe^{3+}$ stabilizing agent is from about 1 M to about 5 M.

7. The iron flow redox cell of claim 1, further comprising a hydrogen evolution suppressing agent chosen from boric acid, a heavy metal, or a combination thereof.

8. The iron flow redox cell of claim 1, wherein the hydrogen evolution suppressing agent is chosen from Pb, Bi, Mn, W, Cd, As, Sb, Sn, or a combination of two or more thereof.

9. The iron flow redox cell of claim 7, comprising boric acid in a concentration of from about 0.1 M to about 5 M.

10. The iron flow redox cell of claim 7, comprising a heavy metal in a concentration of from about 0.0001 M to about 0.1 M.

11. The iron flow redox cell of claim 1, wherein the first electrolyte is an anolyte and the pH of the anolyte is from about 1 to about 6.

12. The iron flow redox cell of claim 1, wherein the first electrolyte is an anolyte and the pH of the anolyte is from about 1 to about 1.8.

13. The iron flow redox cell of claim 1, wherein the second electrolyte is a catholyte and the catholyte comprises a $Fe^{3+}$ stabilizing agent, and the pH of the anolyte is greater than 2.

14. The iron flow redox cell of claim 1, wherein the electrically conductive particles are chosen from graphite particles.

15. The iron flow redox cell of claim 1, wherein the electrode in the first half-cell comprises iron coated particles chosen from graphite, copper, titanium, or a combination of two or more thereof.

16. The iron flow redox cell of claim 1, wherein the electrically conductive particles have a particle size of from about 1 micron to about 1500 mircons.

17. The iron flow redox cell of claim 1 having an energy to power ratio of from about 1:1 to about 10:1.

18. The iron flow redox cell of claim 1 having an energy to power ratio of from about 1:1 to about 5:1.

19. The iron flow redox cell of claim 1 having an energy to power ratio of from about 1:1 to about 3:1.

20. The iron flow redox cell of claim 1 having a plating capacity of from about 150 mAh/$cm^2$ to about 400 mAh/$cm^2$.

21. The iron flow redox cell of claim 1 having a plating capacity of from about 150 mAh/$cm^2$ to about 200 mAh/$cm^2$.

22. The iron flow redox cell of claim 1 having a plating efficiency of from about 60% to about 99%.

23. The iron flow redox cell of claim 1 having a watt-hour efficiency of about 40% to about 85%.

24. The iron flow redox cell of claim 20, wherein the temperature of at least one of the first electrolyte and the second electrolyte is from about 20° C. to about 80° C. during operation of the cell.

25. A battery comprising one or more of the redox flow cells of claim 1.

26. The iron flow redox cell of claim 1, wherein slurry comprises a sufficient volume of particles to maintain electrical conductivity within the first half-cell.

27. The iron flow redox cell of claim 1, wherein the electrically conductive particles have a particle size less than 1000 microns.

28. The iron flow redox cell of claim 1, wherein the electrically conductive particles have an average particle size of about 100 microns.

* * * * *

UNITED STATES PATENT AND TRADEMARK OFFICE
CERTIFICATE OF CORRECTION

PATENT NO. : 9,559,375 B2
APPLICATION NO. : 14/122885
DATED : January 31, 2017
INVENTOR(S) : Robert F. Savinell et al.

Page 1 of 1

It is certified that error appears in the above-identified patent and that said Letters Patent is hereby corrected as shown below:

In the Specification

In Column 1, after Line 12 insert:
--GOVERNMENT FUNDING
This invention was made with government support under government Contract No. DE-AR0000352 awarded by The United States Department of Energy. The government has certain rights in the invention.--

Signed and Sealed this
Second Day of January, 2018

Joseph Matal
*Performing the Functions and Duties of the*
*Under Secretary of Commerce for Intellectual Property and*
*Director of the United States Patent and Trademark Office*